United States Patent Office 3,296,133
Patented Jan. 3, 1967

3,296,133
2-STROKE ENGINE LUBRICANTS
Hyman Ratner, Florissant, Mo., and Merlyn Townsend, Concord, and Romeo Gouley, Walnut Creek, Calif., assignors to Shell Oil Company, New York, N.Y., a corporation of Delaware
No Drawing. Filed Nov. 22, 1963, Ser. No. 325,780
1 Claim. (Cl. 252—46.7)

This invention relates to lubricants for two-stroke engines and more particularly the invention relates to engine lubricants which provide for engine cleanliness and protection from wear, corrosion and undesirable deposits.

Lubricants designed for two-stroke engine lubrication present a number of taxing problems. The lubricants for such purposes is admixed with the fuel (gasoline) and because of this, complicates the problem of spark plug fouling, solid deposits on cylinder walls, exhaust ports and the like. When leaded fuels are used, the problem becomes even more complicated. Additionally, lubricants for this purpose as well as the additives incorporated therein must be compatible with the fuel and cause no wear, corrosion and physical changes, e.g. viscosity, to occur when the two liquids are admixed.

It has now been discovered that an excellent two-stroke lubricant for engines operating on neat or leaded gasoline can be provided by incorporating into a mineral lubricating oil having a viscosity index between about 45 and about 80 and a viscosity range of from 400 SUS at 100° F. to 100 SUS at 210° F., minor amounts of each of (A) an oil-soluble polyamide having the general formula:

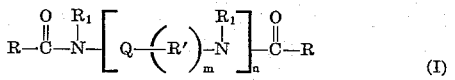

(I)

where R is a hydrocarbyl radical such as an alkyl or alkylene radical of from 8 to 22 carbon atoms, Q is a substituted or unsubstituted alkylene radical of from 1 to 10 carbon atoms, preferably 2–4 carbon atoms such as —CH$_2$CH$_2$— or

R' and R$_1$ are hydrogen or C$_{1-4}$ alkyl radicals, m can be zero or 1 and n is an integer and preferably the compound is represented by Formula Ia

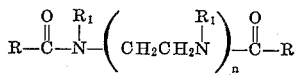

where n is an integer of from 1 to 10 and (B) an oil-soluble 2-thialkyl phosphono compound represented by the following general formula:

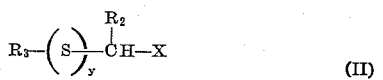

(II)

where X is

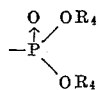

y is an integer of from 1 to 4, R$_3$ is the radical —CH—X or an oil-soluble hydrocarbyl group, such as an alkyl, aryl aralkyl, alkaryl, or cycloalkyl radical having at least 6 and preferably a straight-chain alkyl radical having from 10 to 18 carbon atoms and R$_2$ is the same as R$_1$ in (I) and where one of the R$_4$'s is hydrogen and the other may be hydrogen, hydrocarbyl or cationic radical and (C) an oil-soluble alkyl phenol and/or arylamine.

The oil-soluble polyamides represented by Formula I are prepared by reacting a polyamine such as ethylene diamine, propylene diamine, diethylene triamine, triethylene tetraamine, trimethylene diamine, hexamethylene diamine, N-2-aminoethylpiperazine and the like with aliphatic carboxylic acids of from 2 to 22 carbon atoms such as acetic acid, propionic acid, butyric acid, caprylic acid, capric acid, lauric acid, palmitic acid, stearic acid, oleic acid, ricinoleic acid and mixtures thereof and comprises reacting approximately equimolecular quantities of a polyamine and a fatty acid at between 120° C. and 250° C. for a period of 10 or more hours, preferably under atmospheric pressure. For example, 1 mole of alkyl substituted diethylene triamine

H$_2$N—CH$_2$CH$_2$—N(C$_4$H$_9$)CH$_2$CH$_2$NH$_2$ and two moles of oleic acid were mixed and heated at 175–200° C. for about 10–15 hours in an enclosed vessel under atmospheric conditions until the diamide was formed, after which the reaction was cooled and the end product has the following Formula Ia

RCONHCH$_2$CH$_2$N(C$_4$H$_9$)CH$_2$CH$_2$NHCOR where R is oleyl radical. Other diamides include distearylamide of ethylene diamine, dilauryl amide of diethylene triamine, dioleyl amide of diethylene triamine, diricinoleyl amide of diethylene triamine, dioleylamide of diethylene triamine, dioleylamide of N-2-aminoethyl piperazine and mixtures thereof.

The 2-thiaphosphono compounds of Formula II include subclasses of these materials represented by:

(III)

or

(IV)

or

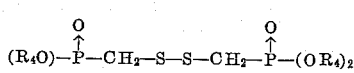

where the R$_3$ and R$_4$ in (III), (IV) and (V) are the same as in (II).

Compounds of (II) containing the monosulfur atom in the molecule as represented by Formula III are prepared by the method described in U.S. Patent 3,041,279 and include such compounds as decylmercaptomethyl phosphonic acid, monobutyl ester of decyl mercaptomethyl phosphonic acid. The following additional compounds are prepared:

Octylmercaptomethylphosphonic acid,
Dodecylmercaptomethylphosphonic acid,
Cyclohexylmercaptomethylphosphonic acid,
Benzylmercaptomethylphosphonic acid,
Phenylmercaptomethylphosphonic acid,
Monobutyl decylmercaptomethylphosphonate,
Phenyldecylmercaptomethyl acid phosphonate,
Dithiobutyl dodecylmercaptomethylphosphonate,
Butyl phenylmercaptomethylphosphonate,
Dithiooctyl cyclohexylmercaptomethylthiophosphonate,
Dioctylamine dodecylmercaptomethylphosphonate,
Dioctadecylamine phenylmercaptomethylphosphonate,
Tert-octadecylaminedodecylmercaptomethylphosphonate,
and mixtures thereof.

The polysulfides are represented by Formula IV such as 2,3-dithia- or 2,3,4-trithia- or 2,3,4,5-tetrathiaalkyl phosphonic compounds are prepared by reacting a mercaptide having at least 6 carbon atoms with a halomethylphosphono compound such as chloromethylphosphonic acid or a dialkylchloromethylphosphonate or their thio derivatives in the presence of elemental sulfur and a suitable solvent, such as an aqueous alcoholic solution, at reflux temperature and under inert conditions until the reaction is completed which normally requires from 1 to about 5 days. The mercaptans include aliphatic mercaptans, such as hexyl, octyl, decyl, dodecyl, octadecyl mercaptans, cycloalkyl mercaptans, such as cyclohexyl mercaptan, dicyclohexyl mercaptan, aralkyl mercaptan; such as phenyldecyl mercaptan, benzyl mercaptan and the like. Instead of the mercaptans, the mercaptides can be used such as the alkali metal (Na or K) mercaptides of the above compounds. Suitable halomethylphosphonic compounds include chloromethylphosphonic acid, mono or dihydrocarbyl chloromethylphosphonates, e.g. mono or dibutyl chloromethylphosphonate, mono or di-2-ethylhexyl chloromethylphosphonate, mono or dilauryl chloromethylphosphonate, mono or dibenzyl chloromethylphosphonate, dibutyl dithiochloromethylphosphonate, diphenyl chloromethyl dithiophosphonate, dibutyl chloromethyltrithiophosphonate, alkali metal salts such as Na and K salts of chloromethylphosphonic acid, Na and K salts of monobutyl chloromethylphosphonic acid, Na and K salt of monodecyl chloromethylphosphonic acid and the like.

A preferred method of making the 2,3-dithia or 2,3,4-trithia or 2,3,4,5-tetrathiaalkylphosphonates is to react a mixture of a suitable mercapto compound such as an alkali metal (Na or K) $C_{10-18}$ alkyl mercaptile, elemental sulfur and a chloromethylphosphonic acid, its ester or salt, e.g. an alkali metal (Na or K) salt of chloromethylphosphonic acid in an alcoholic solution under reflux conditions and under an inert atmosphere to form the alkylpolythiamethylphosphono compound, e.g. the alkali metal salt of thiaalkylphosphonic acid. The salt, for example, is then treated with a strong acid such as hydrochloric acid to spring the free dithiaalkylphosphonic acid, which can be converted into desired partial or full esters of polyvalent metal salts or amine salts for use as oil, fuel and grease additives as well as other uses. If the partial or full ester are the desired end product then instead of starting with the alkylpolymercaptomethylphosphonate, the ester can be used such as the mono or dialkyl ester of chloromethylphosphonic acid.

The following examples illustrate the preparation of additives for use in accordance with the present invention.

*Example I.—Dibutyl 2,3-dithiatridecylphosphonate*

About 174 grams of n-decyl mercaptan was charged into a flask containing about 73 grams of KOH (85%) and 900 ml. of ethanol. To the mixture, 32 grams of elemental sulfur was added and the mixture refluxed until homogeneous at which time about 242.5 grams of dibutyl monochloromethyl phosphonate was added and the mixture refluxed for about 24 hours. The reaction was cooled and the precipitate was separated by water dilution and extracted by repeated ether washing and thereafter dried over $MgSO_4$ and the solvent was vacuum stripped. The end product dibutyl 2,3-dithiatridecyl phosphonate was a straw yellow liquid readily soluble in mineral oil and exhibited good EP properties.

*Example II.—Monobutyl 2,3-dithiatridecylphosphonate*

About 206 grams of the product of Example I was charged into a flask containing aqueous solution of KOH in ethanol and the mixture was refluxed for 48 hours. The reaction product was acidified with dilute HCl and extracted with ether, washed and dried as in Example I, and the recovered product was monobutyl 2,3-dithiatridecylphosphonate, an oil-soluble product having good EP properties.

*Example III.—Decyl 2,3-dithiamethylphosphonic acid*

Stoichiometric amounts of the potassium salt of decyl mercaptan, elemental sulfur and the potassium salt of monochloromethylphosphonic acid were dispersed in an aqueous solution of ethanol and the mixture was refluxed at 78° C. under a nitrogen atmosphere for about 1 day.

The potassium decyl-2,3-dithiamethylphosphonate was then treated with strong hydrochloric acid to spring the acid product which was recovered by extraction with ether. The final product was decyl 2,3-dithiamethylphosphonic acid.

*Example IV.—Phenyl 2,3-dithiamethylphosphonic acid*

The procedure of Example II is followed except that potassium salt of phenylmercaptan is used instead of potassium salt of decylmercaptan and the final product is phenyl 2,3-dithiamethylphosphonic acid.

*Example V.—Di-2-ethylhexylamine, 2,3-dithiatridecylphosphonate*

Di-2-ethylhexylamine salt of 2,3-dithiatridecylphosphonic is prepared by reacting the product of Example III with di-2-ethylhexylamine in an amount sufficient to completely neutralize both acid groups, at about 50° C. in an alcoholic solution and thereafter recovering the amine salt from the alcoholic solution.

The following additional compounds are presented:

2,3-dithiaundecylphosphonic acid,
2,3,4-trithiahexadecylphosphonic acid,
Omega-cyclohexyl-2,3-dithiapropylphosphonic acid,
Omega-phenyl-2,3-dithiabutylphosphonic acid,
Omega-phenyl-2,3,4-trithiabutylphosphonic acid,
Dibutyl-2,3,4-trithiatetradecylphosphonate,
Omega-phenyl-2,3-dithiatridecyl acid phosphonate,
Dibutyl-2,3-dithiapentadecyldithiaphosphonate,
Dibutyl phenyl-2,3-dithiamethylphosphonate,
Dithiooctylcyclohexyl-2,3,4-trithiamethylthiophosphonate,
Dioctyl amine dodecylmercaptomethylphosphonate,
Dioctadecylamine omega-phenyl-2,3-dithiabutylphosphonate,
Tert-octadecylamine 2,3-dithiapentadecyl phosphonate,
Iron salt of 2,3-dithiatridecylphosphonic acid and mixtures thereof.

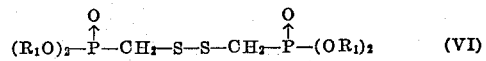

$$(R_1O)_2-\overset{O}{\underset{\uparrow}{P}}-CH_2-S-S-CH_2-\overset{O}{\underset{\uparrow}{P}}-(OR_1)_2 \qquad (VI)$$

where at least one of the $R_1$ is hydrogen and the remaining ones can be alkyl radicals of from 1 to 8 carbon atoms are prepared by reacting an alkali disulfide, e.g. sodium or potassium disulfide, with a halomethyl phosphono compound such as dihydrocarbyl ester of chloromethylphosphonic acid in a suitable solvent such as an aqueous alcoholic solution, at reflux temperature and under inert conditions until the reaction is completed which normally requires from 1 to about 5 days. Suitable halomethylphosphonic compounds include mono- or dihydrocarbyl chloromethylphosphonates, e.g. mono- or di-butyl chloromethylphosphonate, mono- or di-2-ethylhexyl chloromethylphosphonate, mono- or di-lauryl chloromethylphosphonate, mono- or di-phenyl chloromethylphosphonate, mono- or di-cyclohexyl chloromethylphosphonate, mono- or di-benzyl chloromethylphosphonate, dibutyl dithiochloromethylphosphonate, diphenyl chloromethyl dithiophosphonate, dibutyl chloromethyltrithiophosphonate and the like.

A preferred method of making the disulfides of this invention is to react sodium or potassium disulfide with an ester of chloromethylphosphonic acid in an alcoholic solution under reflux conditions and under an inert atmosphere for about 24 hours and thereafter neutralizing to a pH of about 7 and ether extracting and water washing the bis(phosphonomethyl)disulfide. The product can be used as such or treated with a strong acid such as hydrochloric acid to spring the free acid which can be converted into desired partial or full esters.

*Example VI*

Stoichiometric amounts of sodium disulfide and a 50/50 mixture of monobutyl monochloromethylphosphonate and monochloromethylphosphonic acid were refluxed for about 24 hours in an alcoholic solution (ethanol) under nitrogen atmosphere and thereafter the pH of the mixture was adjusted to around 7 and the bis(phosphonomethyl) disulfide mixture was ether extracted and water washed to give a 60–65% yield of bis(phosphonomethyl)disulfide mixture of

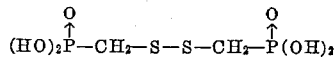

analyzed as follows:

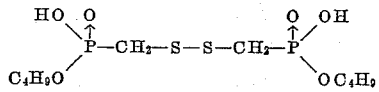

*Example VII*

The procedure for Example VI was followed except that monobutyl chloromethylphosphonate was used in the reaction and the final product was bis(monobutylphosphonomethyl)disulfide.

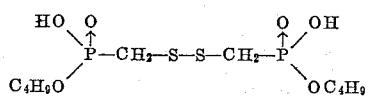

*Example VIII*

Di-2-ethylhexylamine salt of bis(monobutylphosphonomethyl)disulfide was prepared by reacting the product of Example VII with 2-ethylhexylamine in an amount sufficient to neutralize completely both acid (—OH) groups, at about 50° C. in an alcoholic solution and thereafter recovering the amine salt from the alcoholic solution.

*Example IX*

Following the procedure of Example VI, the tert-octadecylamine salt of the product of Example II was prepared using tert-octadecylamine, available commercially under the trade name of Primene JM–T, instead of di-2-ethylhexylamine.

The following additional bis(phosphonomethyl)disulfides illustrate the additive of the present invention: bis(phosphonomethyl)disulfide, bis(monooctyl phosphonomethyl)disulfide, bis(dicyclohexyl phosphonomethyl)disulfide, bis(dibenzyl phosphonomethyl)disulfide, bis(diphenyl phosphonomethyl)disulfide, dioctylamine salt of bis(monobutyl phosphonomethyl)disulfide, tert-octadecylamine salt of bis(monobutyl phosphonomethyl)disulfide, calcium salt of bis(monobutyl phosphonomethyl)disulfide and mixtures thereof.

The third essential additive (C) namely alkyl phenol such may be simple alkyl phenols or preferably alkylated bisphenols and/or arylamines, include alkyl phenols such as 2,4,6-triethyl-, tributyl-, trioctyl-, 2,4-ditert-butyl-6-methyl-, 2,6-ditert-butyl-4-methyl-, 2,4,6-ditert-butyl-, 2,6-dicyclohexyl-4-methyl-, 2,6-dimethyl-4-cyclohexylphenols. The 2,4,6-trialkyl phenols containing two tertiary alkyl groups in the 2,4-, or 2,6-positions are preferred, such as 2,4-ditert-butyl-6-methyl-, 2,6-ditert-butyl-4-methylphenol. The alkylated bisphenols having the general formula:

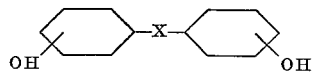

and preferably having the formula:

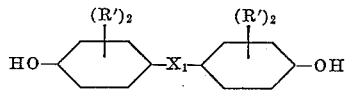

wherein (VII) X stands for —S—, —S—S—, Se, —S—CH$_2$—, —CH$_2$—S—CH$_2$, —CH$_4$—, —CR$_2$—, —(CH$_2$)$_n$—, —NH—, —O—, and R stands for methyl or ethyl, $n$ stands for an integer from 1 to 3; in (VIII), $X_1$ is CH$_2$ or sulfur and R' is a tertiary alkyl radical. The most preferred alkylated bisphenols are represented by Formula VIII, those having a sulfur bridge or, and most especially, a methylene bridge and where R' is a tertiary butyl radical.

The alkylated bisphenols may contain from 1 to 8 alkyl groups, but preferably they contain from 2 to 6 alkyl groups; alkylated bisphenols having 4 alkyl groups are particularly preferred. Each of the alkyl groups may contain from 1 to 10 carbon atoms, preferably 2 to 6 carbon atoms, and especially 4 carbon atoms. Furthermore, the alkyl groups in any particular bisphenol may be the same or different and may also be primary, secondary or tertiary alkyl groups. Bisphenols containing at least one tertiary alkyl group are particularly preferred.

The alkylated bisphenol may be prepared by any of the methods known in the art of bisphenol manufacture for example, by selecting the appropriate alkylated phenols as starting materials and condensing them together by any of the established methods. For example, alkylated bisphenols may be prepared by the method described in U.S. Patent 2,944,086.

As examples of the alkylated bisphenols which may be used according to the invention, there are mentioned Bis(3-ethyl-4-hydroxyphenyl)disulfide,
Bis(3-methyl-4-propyl-5-hydroxyphenyl)disulfide,
Bis(2-isopropyl-3-butyl-5-hydroxyphenyl)selenide,
2,2'-diethyl-3-tertiarybutyl-4,4'-dihydroxydiphenyl selenide,
Bis 1,2(2,6-di-tertiary-butyl-4-hydroxyphenyl)thiaethane,
Bis 1,2(2,5-diisopropyl-3-hydroxyphenyl)thiaethane,
Bis(3,5-di-tertiary-butyl-4-hydroxyphenyl)sulfide,
2,4-diisobutyl-3-hydroxyphenzyl-2',4'-dipropyl-3'-hydroxybenzyl sulfide,
Bis 1,2(3-octyl-5-tertiary-butyl-4-hydroxyphenyl)ethane,
1,2-bis(2,4-di-tertiary pentyl-3-hydroxyphenyl)propane,
Bis 2,2(4,5-di-tertiary-butyl-2-hydroxyphenyl)propane,
Bis(2-tertiary-butyl-5-isopentyl-4-hydroxyphenyl)amine,
Bis(3,5-dibutyl-5-hydroxyphenyl)ether,
Bis(2,6-dipropyl-4-hydroxyphenyl)ether.

Preferred compounds are the alkylated bisphenols having a sulfur or methylene bridge, the former including Bis(2,5-dipentyl-4-hydroxyphenyl)sulfide,
Bis(2,5-dihexyl-3-hydroxyphenyl)sulfide,
Bis(2-methyl-5-tertiary-butyl-4-hydroxyphenyl)sulfide,
Bis(2-methyl-5-tertiary-butyl-6-hydroxyphenyl)sulfide and, particularly, Bis(3-tertiary-butyl-5-methyl-2-hydroxyphenyl)sulfide, and examples of the latter, namely, alkylated bisphenols having a methylene bridge, include Bis(2,3-ditertiary-butyl-4-hydroxyphenyl)methane,
Bis(2,5-ditertiary-butyl-4-hydroxyphenyl)methane,
Bis(2,6-ditertiary-butyl-4-hydroxyphenyl)methane,
Bis(3,5-ditertiary-octyl-4-hydroxyphenyl)methane,
Bis(3-tertiary-butyl-5-tertiary-octyl-4-hydroxyphenyl) methane, and, especially, Bis(3,5-ditertiary-butyl-4-hydroxyphenyl)methane.

The arylamines which can be used wholly or in part preferably from 0.1 to 20% of the amount of phenol used include phenyl-alpha-naphthylamine, phenyl-beta-naphthylamine, phenylene diamine, dibenzylamine and the like.

Minor amounts of each class of additives are sufficient for a highly effective combination and may be used in amounts of about 0.1–10% each, preferably about 0.2–5% by weight each, while about 0.05–2%, preferably about 0.1–1%, of the methylene bisphenol is highly useful.

The oil compositions of the present invention can be illustrated by the following examples:

Composition A:                                                Percent, weight
  Dioleylamide  RCONHCH$_2$CH$_2$N(C$_4$H$_9$)-CH$_2$CH$_2$NHCOR  (R=oleyl radical) -- 2
  2 - mercapto (thia) dodecyl phosphonic acid -- 0.1
  2,4-ditert.butyl-6-methyl phenol -- 0.5
  Mineral lubricating oil (45% 400/100 MVI, 55% 80/210 MVI) (X) -- Balance Composition B:
  Dioleylamide  RCONHCH$_2$CH$_2$N(C$_4$H$_9$)-CH$_2$CH$_2$NHCOR  (R=oleyl radical) -- 2
  2 - mercapto (thia) dodecyl phosphonic acid -- 0.1
  Bis(3,5 - ditert.butyl - 4 - hydroxyphenyl) methane -- 0.5
  Mineral lubricating oil (X) -- Balance Composition C:
  Dioleylamide  RCONHCH$_2$CH$_2$N(C$_4$H$_9$)-CH$_2$CH$_2$NHCOR  (R=oleyl radical) -- 2
  Monobutyl dodecyl 2 - thiamethyl phosphonic acid -- 0.1
  Bis(3,5 - ditert.butyl - 4 - hydroxyphenyl) methane -- 0.5
  Mineral lubricating oil (X) -- Balance Composition D:
  Dioleylamide  RCONHCH$_2$CH$_2$N(C$_4$H$_9$)-CH$_2$CH$_2$NHCOR  (R=oleyl radical) -- 2
  Monobutyl dodecyl 2 - thiamethyl phosphonic acid -- 0.1
  Phenyl-alpha-naphthylamine -- 0.5
  Mineral lubricating oil (X) -- Balance Composition E:
  Dioleylamide  RCONHCH$_2$CH$_2$N(C$_4$H$_9$)-CH$_2$CH$_2$NHCOR  (R=oleyl radical) -- 2
  Monobutyl dodecyl 2 - thiamethyl phosphonic acid -- 0.1
  Bis(3,5 - ditert.butyl - 4 - hydroxyphenyl) methane -- 0.5
  Mineral lubricating oil (X) -- Balance Composition F:
  Distearylamide  RCONHCH$_2$CH$_2$N(C$_4$H$_9$)-CH$_2$CH$_2$NHCOR  (R=stearyl radical) -- 2
  Bis(monobutyl phosphonomethyl)disulfide -- 0.1
  Bis(3,5 - ditert.butyl - 4 - hydroxyphenyl) methane -- 0.5
  Mineral lubricating oil (X) -- Balance Oil compositions of the present invention such as Compositions A–F are blended with the fuel, e.g. gasoline, diesel fuel, etc. in amounts from about 0.2 to 5 pints, preferably 1–2 pints per gallon of fuel, e.g. neat or leaded gasoline or the oil compositions can be used in the ratio of 1 part of oil composition, e.g. A–F to 15–50 pints of fuel, 1 part of oil composition to 20–30 parts of fuel is preferred.

Compositions of the present A–F (1 part per 20 parts gasoline) were tested in a 2-stroke marine engine of the outboard type for 25 hours, and the engine performance was excellent, with no spark plug fouling, port blockage, the preignition was excellent and the engine was clean and in excellent condition. Also these compositions at concentration indicated were tested in the 25-hour McCulloch chain-saw cleanliness test and Compositions A–F gave a rating of 80–95 (100 2 perfect and 0 = poor) whereas when the thia-phosphono compounds from A–F were omitted, ratings of 10–40 were obtained and in the 2-stroke marine engine such composition causes heavy deposits and spark plug fouling.

The oil composition of the present invention can also be used in other types of engines such as internal combustion engines, diesel engines, and for the lubrication of various industrial equipment.

We claim as our invention:

A lubricant composition for 2-stroke engines which employs a lubricant-fuel mixture comprising a major amount of mineral lubricating oil having a viscosity index of 45–80 and a viscosity of from 400 SUS at 100° F. to 100 SUS at 210° F. and from 0.1% to 10% each of dioleylamide of H$_2$NCH$_2$CH$_2$N(C$_4$H$_9$)CH$_2$CH$_2$NH$_2$, 2-thiadodecyl phosphonic acid and bis(3,5-diert.butyl-4-hydroxyphenyl)methane.

References Cited by the Examiner
UNITED STATES PATENTS

| | | | |
|---|---|---|---|
| 2,291,396 | 7/1942 | Lieber | 252—51.5 |
| 2,622,067 | 12/1952 | White et al. | 252—51.5 |
| 3,041,279 | 6/1962 | Calhoun et al. | 252—46.7 |
| 3,110,673 | 11/1963 | Benoit | 252—51.5 |
| 3,216,936 | 11/1965 | Le Suer | 44—58 |

DANIEL E. WYMAN, *Primary Examiner.*

L. G. XIARHOS, *Assistant Examiner.*